Figure 1:
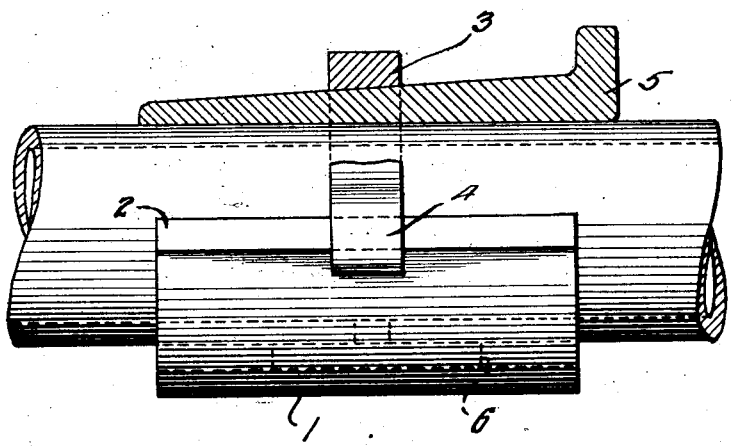

July 17, 1928.

O. P. EILAR 1,677,623

PATCH CLAMP FOR PIPES

Filed April 16, 1927

Inventor
O. P. EILAR
By R. J. Whitaker
his Attorney

Patented July 17, 1928.

1,677,623

UNITED STATES PATENT OFFICE.

OLIVER P. EILAR, OF LAWRENCEVILLE, ILLINOIS.

PATCH CLAMP FOR PIPES.

Application filed April 16, 1927. Serial No. 184,264.

The invention relates to clamps or saddles by which a patch may be securely held over a leak in a pipe.

An important object of the device is to provide a clamp which may be easily and quickly applied without the means of special tools.

Other objects and advantages are apparent from the accompanying drawings and description.

Figure 2:
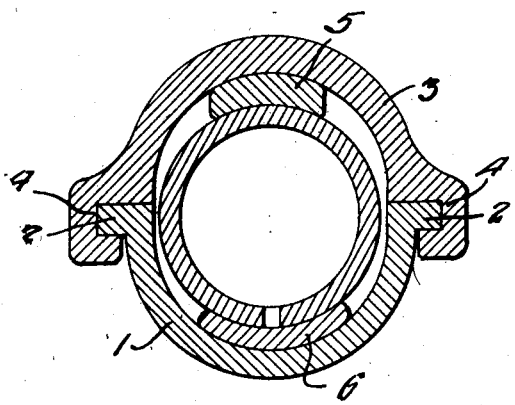

In the drawings:

Figure 1 is a side elevation partly in vertical longitudinal section of the clamp shown applied to a fragment of pipe, and Figure 2 is a vertical cross section thereof.

In the description in which like characters of reference are employed to designate like parts throughout the same, the numeral 1 is the bottom section of the clamp or saddle, that portion which covers the hole or break. This saddle 1 is virtually semicircular in cross section and is provided on each of its longitudinal edges with a flange 2. Adapted to interlock with the saddle 1 is a clamping member 3 which is also virtually semicircular in cross section and is provided adjacent each of its longitudinal edges with a groove 4 which is adapted to engage the flange 2. As will be seen from Figure 1 this clamping member 3 tapers in its intermediate longitudinal section to provide for a wedge 5 which is forced between the pipe and the clamp 3.

A patch 6 of soft rubber or other suitable material is placed over the hole or leak in the pipe being held in place by means of saddle 1. The clamp 3 is then put in position as shown in the drawings and the wedge driven in place forcing the saddle 1 against the patch 6 making a tight and efficient stoppage of the leak.

It must be understood that only a preferred form of my invention is herein shown and described and any change therein may be made such as in size and shape without departing from the theory of my invention or from the scope of the appended claim.

Having thus described my invention what I claim is:

A patch clamp for a pipe comprising a flanged semicylindrical saddle, a patch interposed between said saddle and said pipe adapted to stop a leak in said pipe, a clamping member having grooves, said grooves adapted for interlocking engagement with the flanges of the saddle and a wedge positioned between the pipe and clamping member to frictionally hold the assembled members tightly in position.

OLIVER P. EILAR.